United States Patent
Suzuki et al.

(10) Patent No.: US 8,804,487 B2
(45) Date of Patent: Aug. 12, 2014

(54) COMMUNICATION SYSTEM CONTROL APPARATUS, CONTROL METHOD, AND PROGRAM

(75) Inventors: Kazuya Suzuki, Tokyo (JP); Junichi Yamato, Tokyo (JP)

(73) Assignee: NEC Corporation, Tokyo (JP)

( * ) Notice: Subject to any disclaimer, the term of this patent is extended or adjusted under 35 U.S.C. 154(b) by 13 days.

(21) Appl. No.: 13/067,909

(22) Filed: Jul. 6, 2011

(65) Prior Publication Data

US 2011/0267979 A1    Nov. 3, 2011

Related U.S. Application Data

(63) Continuation of application No. PCT/JP2010/067519, filed on Oct. 6, 2010.

(30) Foreign Application Priority Data

Oct. 7, 2009    (JP) .................................. 2009-233891

(51) Int. Cl.
  *H04L 12/26* (2006.01)
  *H04L 12/28* (2006.01)
  *G06F 15/173* (2006.01)

(52) U.S. Cl.
  USPC ........... 370/217; 370/218; 370/221; 370/255; 370/351; 709/239

(58) Field of Classification Search
  None
  See application file for complete search history.

(56) References Cited

U.S. PATENT DOCUMENTS

| 6,122,753 | A  | * | 9/2000 | Masuo et al. ............... 714/4.2 |
| 6,639,897 | B1 |   | 10/2003 | Shiomoto et al. |
| 6,721,899 | B1 | * | 4/2004 | Narvaez-Guarnieri et al. .................. 714/4.3 |
| 6,914,880 | B1 | * | 7/2005 | Grover et al. ............ 370/221 |

(Continued)

FOREIGN PATENT DOCUMENTS

| JP | 2000-236336 A | 8/2000 |
| JP | 2003-87311 (A) | 3/2003 |
| JP | 2008-054233 A | 3/2008 |
| JP | 2009-060392 A | 3/2009 |

OTHER PUBLICATIONS

N. McKeown et al., "Openflow: Enabling Innovation in Campus Networks", URL: http://www.openflowswitch.org/documents/openflow-wp-latest.pdf, Mar. 14, 2008.

(Continued)

*Primary Examiner* — Marsha D Banks Harold
*Assistant Examiner* — Christopher Wyllie
(74) *Attorney, Agent, or Firm* — McGinn IP Law Group, PLLC

(57) ABSTRACT

A control apparatus comprises: a switch extraction unit extracting a second switch adjacent to a first switch that stops in a communication system including a plurality of switches having a predetermined topology; a flow extraction unit extracting a flow transferred to the first switch after the second switch from a plurality of flows passing through the communication system; a path determination unit determining, assuming that, among the plurality of switches, switches located at start and end nodes of the flow are third and fourth switches, respectively, a path from the second switch to the fourth switch, based on a topology obtained by excluding the first switch from the predetermined topology; and a path generation unit connecting a path from the third switch to the second switch in an initial path of the flow and a path determined by the path determination unit to generate a new path of the flow.

12 Claims, 11 Drawing Sheets

(56) References Cited

U.S. PATENT DOCUMENTS

| | | | |
|---|---|---|---|
| 7,107,329 B1* | 9/2006 | Schroder et al. | 709/221 |
| 7,180,866 B1* | 2/2007 | Chartre et al. | 370/242 |
| 7,362,709 B1* | 4/2008 | Hui et al. | 370/237 |
| 7,656,792 B2* | 2/2010 | Zhang et al. | 370/228 |
| 7,664,049 B1* | 2/2010 | Arrakoski et al. | 370/254 |
| 7,990,946 B2* | 8/2011 | Deguchi | 370/351 |
| 8,432,913 B2* | 4/2013 | Suzuki et al. | 370/392 |
| 2002/0012318 A1* | 1/2002 | Moriya et al. | 370/225 |
| 2002/0067693 A1* | 6/2002 | Kodialam et al. | 370/216 |
| 2002/0172149 A1* | 11/2002 | Kinoshita et al. | 370/216 |
| 2003/0189926 A1* | 10/2003 | Watanabe et al. | 370/389 |
| 2003/0208572 A1* | 11/2003 | Shah et al. | 709/223 |
| 2003/0223379 A1* | 12/2003 | Yang et al. | 370/256 |
| 2004/0004938 A1* | 1/2004 | Buddhikot et al. | 370/238 |
| 2004/0133590 A1* | 7/2004 | Henderson et al. | 707/102 |
| 2004/0156633 A1* | 8/2004 | Kaspit et al. | 398/30 |
| 2004/0215761 A1* | 10/2004 | Fujii et al. | 709/223 |
| 2006/0013127 A1* | 1/2006 | Izaiku et al. | 370/225 |
| 2006/0087965 A1* | 4/2006 | Shand et al. | 370/218 |
| 2006/0153200 A1* | 7/2006 | Filsfils et al. | 370/395.31 |
| 2006/0256712 A1* | 11/2006 | Imajuku et al. | 370/218 |
| 2006/0268682 A1* | 11/2006 | Vasseur | 370/216 |
| 2007/0041316 A1* | 2/2007 | Chaudhuri | 370/218 |
| 2008/0049609 A1* | 2/2008 | Chao et al. | 370/218 |
| 2008/0089246 A1* | 4/2008 | Ghanwani et al. | 370/256 |
| 2008/0232347 A1* | 9/2008 | Chao et al. | 370/351 |
| 2010/0074115 A1* | 3/2010 | Klincewicz et al. | 370/238 |
| 2011/0261723 A1* | 10/2011 | Yamato et al. | 370/255 |
| 2012/0039164 A1* | 2/2012 | Enyedi et al. | 370/217 |
| 2013/0155840 A1* | 6/2013 | Li et al. | 370/217 |

OTHER PUBLICATIONS

Notice of the Grounds for Rejection dated Jun. 10, 2014, with partial English translation.

* cited by examiner

FIG. 5A
| OLD PATH : S → A → X → D |
| BYPASS PATH : A → S → E → F → G → D |
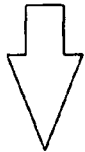
FIG. 5B
| OLD PATH : S → A |
| BYPASS PATH : A → S → E → F → G → D |
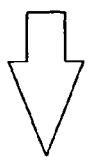
FIG. 5C
| NEW PATH : S → A → S → E → F → G → D |
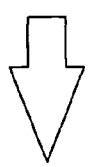
FIG. 5D
| NEW PATH : S → E → F → G → D |

FIG. 7A
| OLD PATH : S → A → B → N → X → D |
| BYPASS PATH : N → B → A → C → E → F → D |
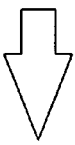
FIG. 7B
| OLD PATH : S → A → B → N |
| BYPASS PATH : N → B → A → C → E → F → D |
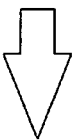
FIG. 7C
| NEW PATH : S → A → B → N → B → A → C → E → F → D |
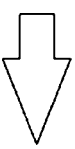
FIG. 7D
| NEW PATH : S → A → B → A → C → E → F → D |
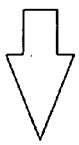
FIG. 7E
| NEW PATH : S → A → C → E → F → D |

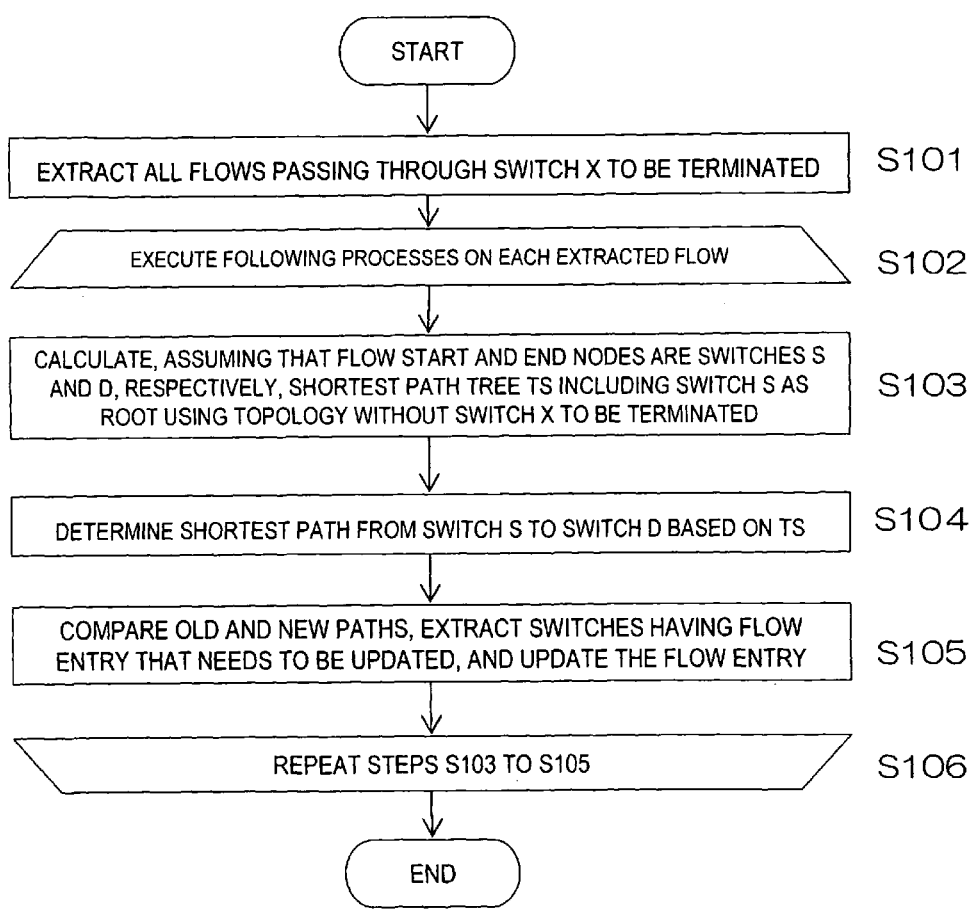
FIG. 9 — RELATED ART

COMMUNICATION SYSTEM CONTROL APPARATUS, CONTROL METHOD, AND PROGRAM

REFERENCE TO RELATED APPLICATION

This application is a continuation of International Application No. PCT/JP2010/067519, filed on Oct. 6, 2010, and claims priority to Japanese Patent Application No. 2009-233891 filed on Oct. 7, 2009, both of which are incorporated herein by reference in their entireties.

TECHNICAL FIELD

The present invention relates to a communication system control apparatus, method, and program. In particular, it relates to an apparatus, a method, and a program for controlling a communication system in which components functioning as switches transferring data and a component functioning as a control apparatus (controller) controlling the switches are separately included.

BACKGROUND

As an example of a communication system in which components transferring data and a component controlling a network are separately included, a communication system in which switches transfer data and a control apparatus (controller) controls the network is known. Examples of a protocol realizing such communication system include OpenFlow (Non-Patent Document 1). In OpenFlow, communication is deemed as an end-to-end flow, and routing control and the like are executed for each flow. The switches, each of which functioning as a transfer node, include secure channels for communication with the controller and operate in accordance with OpenFlow tables added or specified by the controller as needed. In the flow tables, a group of: rules (Flowkey) checked against a packet header; actions (Actions) defining process contents; and flow statistics information (Stats) are defined for each flow.

FIG. 8 schematically illustrates a configuration of a communication system based on OpenFlow. With reference to FIG. 8, the communication system includes a control apparatus (controller) 110 and a plurality of switches S, A, X, and D. The control apparatus 110 controls paths, and the switches S, A, X, and D transfer the respective packets.

A packet transfer process of OpenFlow will be described with reference to FIG. 8. When the first packet included in a flow arrives at a switch (the switch S in FIG. 8) located at an input port of the communication system, the switch S sends the packet to the control apparatus 110. The control apparatus 110 determines a path for the flow and writes a forwarding entry corresponding to the flow in the switches (switches S, A, X, and D) on the path. Subsequent packets arriving at the communication system are transferred in accordance with the forwarding entry written in the switches S, A, X, and D.

Since the control apparatus 110 determines all paths, the control apparatus 110 holds all the necessary information for changing of paths (path determination). In path calculation in OpenFlow, a different policy can be used for each flow. However, as an example, the following description will be made assuming that all flows are calculated based on a single policy. In addition, as an example, the following description will be made assuming that each path is the shortest path between two nodes.

[Non-Patent Document 1]
N. McKeown et al., "Openflow: Enableing Innovation in Campus Networks,"<URL:http://www.openflowswitch.org/documents/openflow-wp-latest.pdf>

SUMMARY

The entire disclosure of the above Non-Patent Document is incorporated herein by reference thereto. The following analyses are given from a viewpoint of the present invention.

When a certain switch of the communication system is terminated for maintenance purpose, flows passing through the switch need to be transferred to other switches. However, if the number of flows is enormous, the control apparatus (controller) 110 needs to execute an enormous amount of calculation. The grounds will be hereinafter described based on specific examples.

FIG. 9 is a flow chart of an operation of the control apparatus 110. FIGS. 10 and 11 illustrate the operation of the control apparatus 110. FIG. 10A illustrates an example of inter-switch topology information about a base switch group. In FIG. 10A, a switch X is a switch whose function to be terminated in the switch group.

In FIG. 9, the control apparatus 110 extracts flows passing through the switch X to be stopped (step S101). Next, the control apparatus 110 executes processes from steps S103 to S105 on each of the extracted flows (step S102). The flows passing through the switch X include a flow including a path S→A→X→D. As illustrated in FIG. 10A, start and end nodes of the flows passing through the switch X to be stopped are set to S (Start) and D (Destination), respectively.

By using a topology without the switch X to be terminated, a shortest path tree TS including the switch S as a root is calculated (step S103). For example, the shortest path tree TS can be obtained by using Dijkstra's algorithm, which can solve shortest path problems efficiently.

Next, based on the shortest path tree TS, the shortest path from the switch S to the switch D is determined (step S104). In FIG. 10B, the shortest path from S to D, that is, a new path from S to D, is a path S→E→F→G→D.

FIG. 11 illustrates paths before and after the switch X is terminated. The arrows in FIG. 11 illustrate the shortest path tree before the switch X stops. With reference to FIG. 11, the old path before the switch X is terminated is the path S→A→X→D, and the new path after the switch X is terminated is the path S→E→F→G→D. The control apparatus 110 compares the new and old paths, extracts switches having flow entries that need to be updated, and updates the flow entries (step S105). The control apparatus deletes relevant flow entries from the individual switches in the old path and registers relevant flow entries in the individual switches in the new path. If, in a switch, a flow entry to be deleted in the old path and a flow entry to be registered in the new path are identical, the operations of deletion and registration can be omitted.

The above processes from steps S103 to S105 are repeated for all the flows (step S106).

Among the above processes, in the step S103 of calculating the shortest path tree, load on the control apparatus increases with the number of switches forming the switch group. Thus, it is preferable that the calculation cost of the shortest path tree be reduced. In the flow chart of FIG. 9, if the number of flows is n, the shortest path tree TS needs to be calculated n times. If flows have the same start node, a single shortest path tree TS is determined. Thus, by caching the shortest path tree TS calculated in step S103, the number of calculations of the shortest path tree can be reduced. However, even in this case, if the number of flow start nodes is s, the shortest path trees need to be calculated s times.

Therefore, there is a need in the art to provide a communication system control apparatus, control method, and program that reduce cost of path recalculation executed by a control apparatus when a switch is terminated.

According to a first aspect of the present invention, there is provided a communication system control apparatus comprising:

a switch extraction unit extracting a second switch adjacent to a first switch to be terminated in a communication system including a plurality of switches having a predetermined topology;

a flow extraction unit extracting a flow transferred to the first switch after the second switch from a plurality of flows passing through the communication system;

a path determination unit determining, assuming that, among the plurality of switches, switches located at start and end nodes of the flow are third and fourth switches, respectively, a path from the second switch to the fourth switch, based on a topology obtained by excluding the first switch from the predetermined topology; and a path generation unit connecting a path from the third switch to the second switch in an initial path of the flow and a path determined by the path determination unit to generate a new path of the flow.

According to a second aspect of the present invention, there is provided a communication system control method comprising:

by a computer, extracting a second switch adjacent to a first switch to be terminated in a communication system including a plurality of switches having a predetermined topology;

extracting a flow transferred to the first switch after the second switch from a plurality of flows passing through the communication system;

determining, assuming that, among the plurality of switches, switches located at start and end nodes of the flow are third and fourth switches, respectively, a path from the second switch to the fourth switch, based on a topology obtained by excluding the first switch from the predetermined topology; and connecting a path from the third switch to the second switch in an initial path of the flow and a path determined in the determining to generate a new path of the flow.

According to a third aspect of the present invention, there is provided a program causing a computer to execute:

extracting a second switch adjacent to a first switch to be terminated in a communication system including a plurality of switches having a predetermined topology;

extracting a flow transferred to the first switch after the second switch from a plurality of flows passing through the communication system; determining, assuming that, among the plurality of switches, switches located at start and end nodes of the flow are third and fourth switches, respectively, a path from the second switch to the fourth switch, based on a topology obtained by excluding the first switch from the predetermined topology; and connecting a path from the third switch to the second switch in an initial path of the flow and a path determined in the determining to generate a new path of the flow. The program may be recorded on a non-transitory computer readable medium.

Effect of the Invention

The present invention provides the following advantage, but not restricted thereto. Based on the communication system control apparatus, control method, and program according to the present invention, cost of path recalculation executed by the control apparatus when a switch is terminated can be reduced.

BRIEF DESCRIPTION OF THE DRAWINGS

FIGS. 5A to 5D illustrate an operation of the control apparatus in the first example.

FIGS. 7A to 7E illustrate an operation of the control apparatus in the second example.

FIG. 9 is a flow chart of an operation of a conventional control apparatus.

PREFERRED MODES

Exemplary Embodiment

Figure 1:
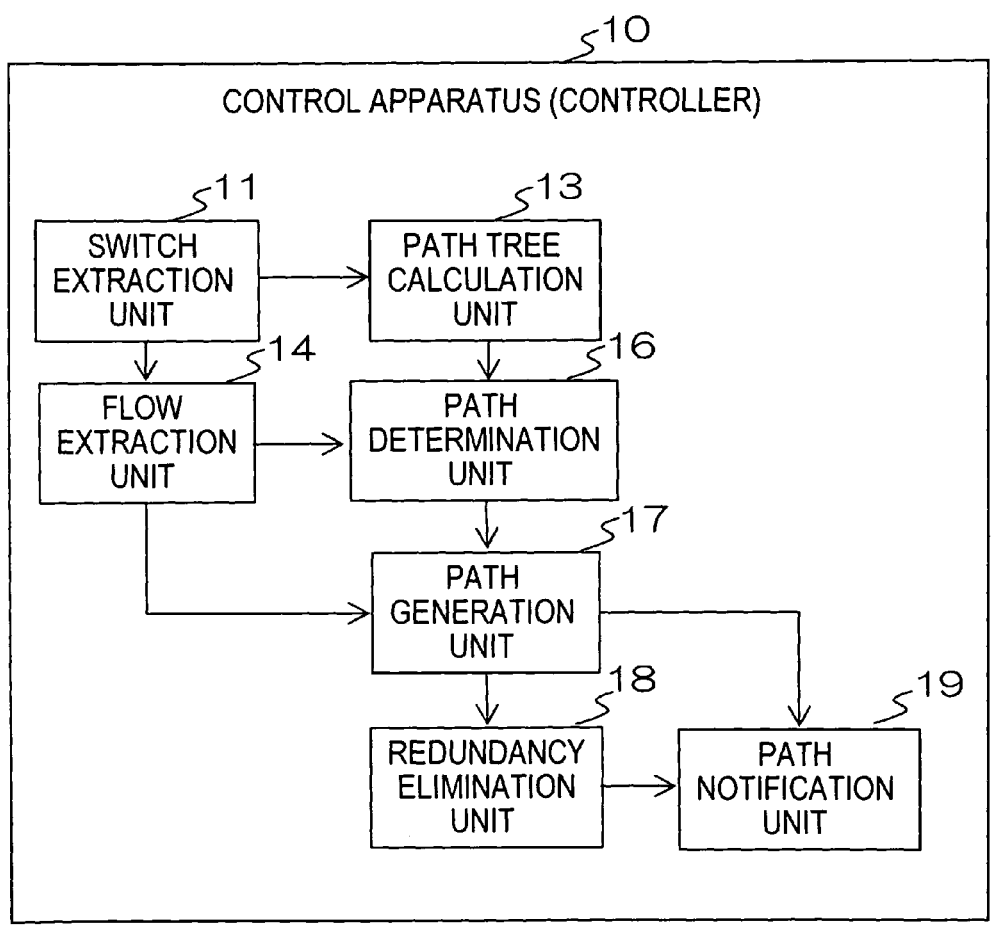
FIG. 1 is a block diagram of a configuration of a control apparatus according to an exemplary embodiment.

A control apparatus according to an exemplary embodiment of the present invention will be described with reference to the drawings. FIG. 1 is a block diagram of a configuration of a control apparatus 10 according to the present exemplary embodiment. With reference to FIG. 1, the control apparatus 10 includes a switch extraction unit 11, a path tree calculation unit 13, a flow extraction unit 14, a path determination unit 16, and a path generation unit 17.

The switch extraction unit 11 extracts a second switch adjacent to a first switch that is terminated in a communication system including a plurality of switches having a predetermined topology.

The path tree calculation unit 13 calculates the shortest path tree including the second switch as a root, based on a topology obtained by excluding the first switch from the predetermined topology.

The flow extraction unit 14 extracts flows in which the next transfer destination after the second switch is the first switch.

Assuming that, among the plurality of switches, switches located at a flow start node and a flow end node are third and fourth switches, respectively, the path determination unit 16 determines a path from the second switch to the fourth switch, based on the shortest path tree.

The path generation unit 17 connects a path from the third switch to the second switch in the old path of the above flow and a path determined by the path determination unit 16 to generate a new path of the above flow.

The control apparatus 10 may further include a path notification unit 19. The path notification unit 19 compares the old path of the flow with the new path of the flow, extracts switches having flow entries that need to be updated from the plurality of switches, and notifies the extracted switches of the new path of the flow.

The control apparatus 10 may further include a redundancy elimination unit 18. If the new path includes a redundant switch, the redundancy elimination unit 18 eliminates a redundant rout in the new path. If an identical switch is used before and after the second switch in the new path, the redundancy elimination unit 18 eliminates a redundant path between the second switch and the identical switch. The redundancy elimination unit 18 may be configured to repeat the process of eliminating a redundant path, if an identical switch is used before and after the identical switch.

Figure 2:
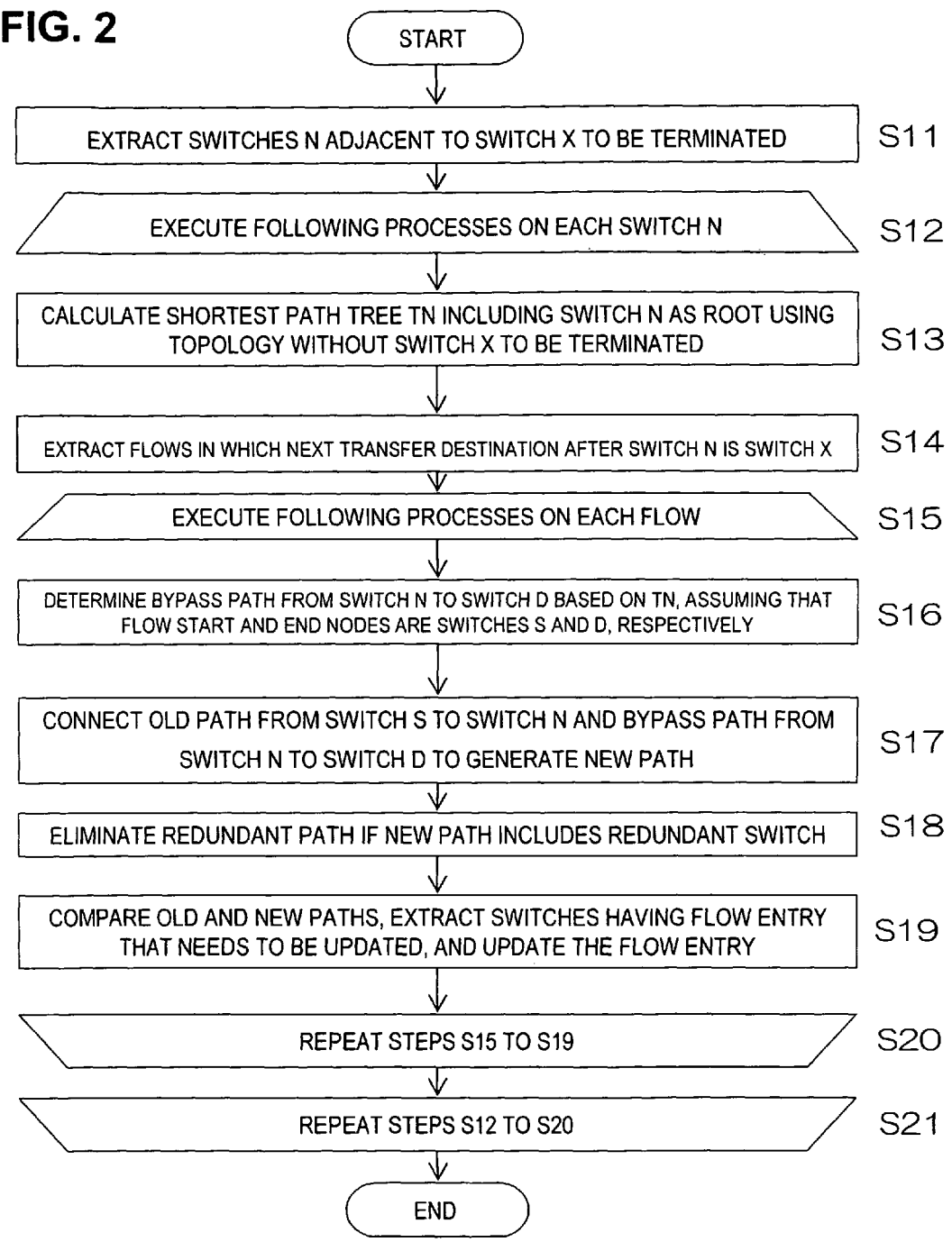
FIG. 2 is a flow chart of an operation of the control apparatus according to the exemplary embodiment.

Next, an operation of the control apparatus 10 will be described with reference to the drawings. FIG. 2 is a flow chart of an operation of the control apparatus according to the present exemplary embodiment. With reference to FIG. 2, the switch extraction unit 11 extracts switches N adjacent to a switch X to be terminated (step S11). The control apparatus 10 executes the following processes on each of the switches N (step S12).

The path tree calculation unit 13 calculates the shortest path tree TN including the switch N as a root, by using a topology without the switch X to be stopped (step S13).

The flow extraction unit 14 extracts all the flows in which the next transfer destination after a switch N is the switch X (step S14). The control apparatus 10 executes the following processes on each of the flows (step S15).

Assuming that flow start and end nodes are set to S (start) and D (destination), respectively, the path determination unit 16 determines a bypass path from the switch N to the switch D, based on the shortest path tree TN (step S16).

The path generation unit 17 connects an old path from the switch S to the switch N and the bypass path from the switch N to the switch D to generate a new path (step S17).

If the new path includes a redundant switch, the redundancy elimination unit 18 eliminates a redundant path (step S18).

The path notification unit 19 compares the old and new paths, extracts switches having flow entries that need to be updated, and updates the flow entries (step S19).

The control apparatus 10 repeats the above steps S15 to S19 (step S20) and steps S12 to S20 (step S21).

Assuming that the number of switches adjacent to the switch X to be stopped is m, the control apparatus 10 according to the present exemplary embodiment calculates the shortest path tree only m times (step S13). Generally, the number m of adjacent switches is smaller than the number of flows and the number s of start nodes in all the flows. Calculation of the shortest path tree generally requires high calculation load. However, based on the control apparatus 10 according to the present exemplary embodiment, the number of calculations of the shortest path tree can be reduced. Namely, calculation costs of path recalculation executed when a switch is terminated can be reduced.

Figure 3:
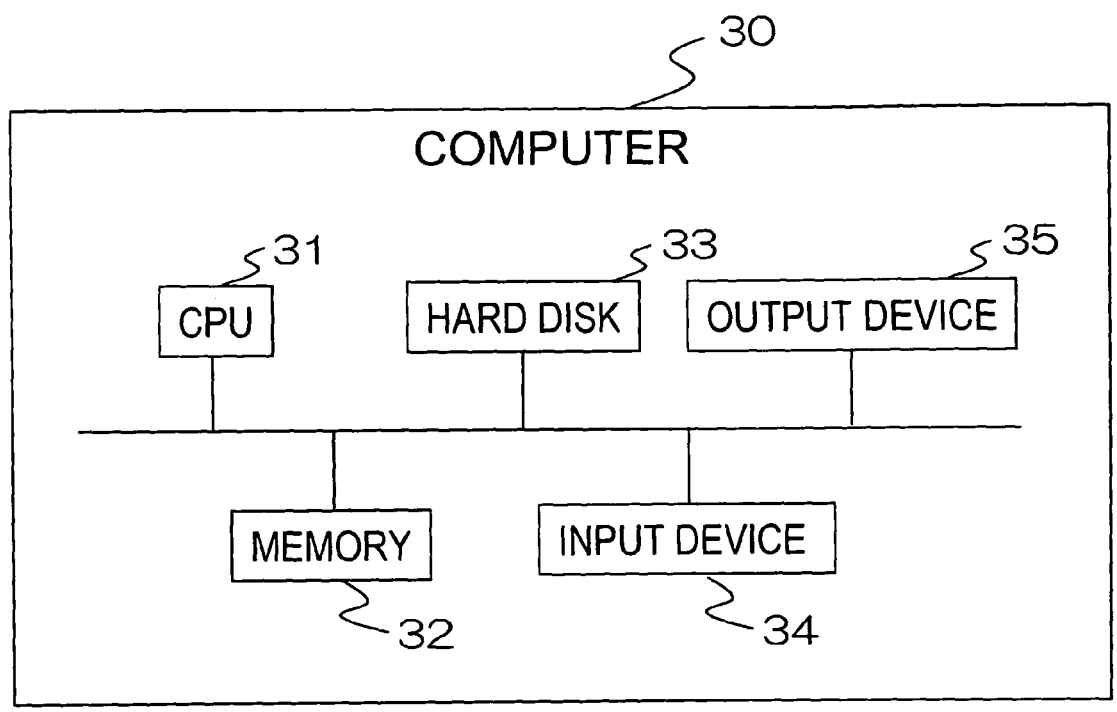
FIG. 3 is a block diagram of a hardware configuration of a computer executing a program according to an exemplary embodiment.

The control apparatus 10 can be realized by a computer program. FIG. 3 is a block diagram of a hardware configuration of a computer executing the program. In FIG. 3, a computer 30 includes a CPU 31, a memory 32, a hard disk 33, an input device 34, and an output device 35. The program causes the CPU 31 to execute the processes of the individual units in the control apparatus 10. The input device 34 may include a mouse and a keyboard. The output device 35 may include a display. The hard disk 33 may store the above program and network topology information.

First Example

Next, an operation of the control apparatus 10 according to an exemplary embodiment of the present invention will be described based on a specific topology of a switch group.

Figure 4A:
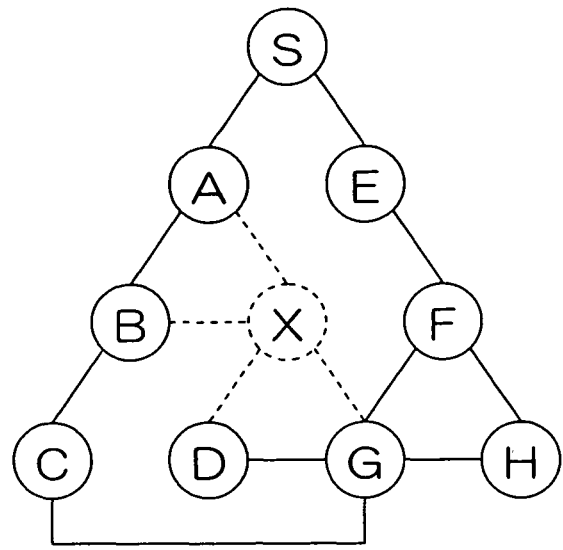
FIGS. 4A and 4B illustrate an operation of a control apparatus in a first example.
Figure 4B:
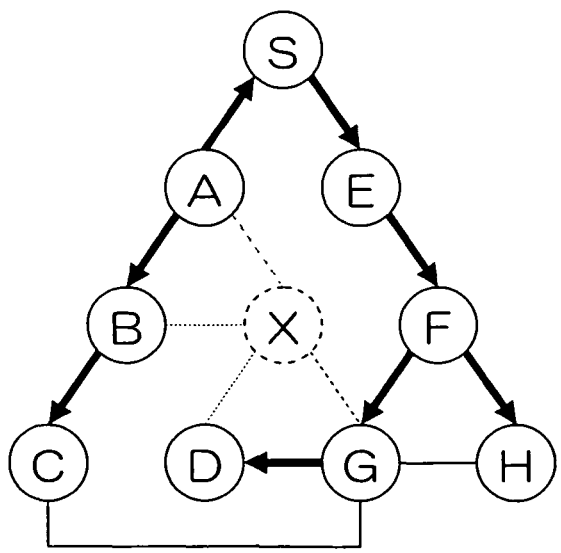

FIGS. 4A and 4B illustrate calculation of the shortest path tree (step S13 in FIG. 2) executed by the control apparatus 10. FIGS. 4A and 4B illustrate a network topology according to the present example. FIG. 4A illustrates a base topology. A switch X is a switch to be terminated.

By using a switch A as a root, which is a switch adjacent to the switch X, a shortest path tree TA is calculated (step S13 in FIG. 2). Based on the calculated shortest path tree TA, a bypass path from the switch A to a switch D is determined as a path A→S→E→F→G→D (step S16 in FIG. 2).

FIGS. 5A to 5D illustrate generation of a new path (step S17 in FIG. 2) and elimination of a redundant path (step S18 in FIG. 2) executed by the control apparatus 10.

With reference to FIG. 5A, an old path before the switch X is terminated is a path S→A→X→D. On the other hand, a bypass path obtained in step S16 is a path A→S→E→F→G→D (see FIG. 4B). Since the switch X and the switch thereafter in the old path are not used, these switches are deleted. FIG. 5B illustrates the old path and the bypass path after the switches are deleted. By connecting the two paths, a new path S→A→S→E→F→G→D is obtained, as illustrated in FIG. 5C (step S17 in FIG. 2).

Next, the switches before and after the switch A, which has connected the two paths, are compared with each other. If an identical switch is used before and after the switch A, the redundant path is eliminated (step S18 in FIG. 2). In FIG. 5C, since both the switches before and after the switch A are the switch S, the redundant path is deleted. FIG. 5D illustrates a new path S→E→F→G→D obtained after the redundant path is deleted. The switches before and after the switch S whose path has been compressed are compared again. In the present example, since further compression cannot be executed, the path S→E→F→G→D is determined to be a new path after the switch X stops.

Second Example

Next, an operation of the control apparatus 10 according to an exemplary embodiment of the present invention will be described based on another network topology.

Figure 6:
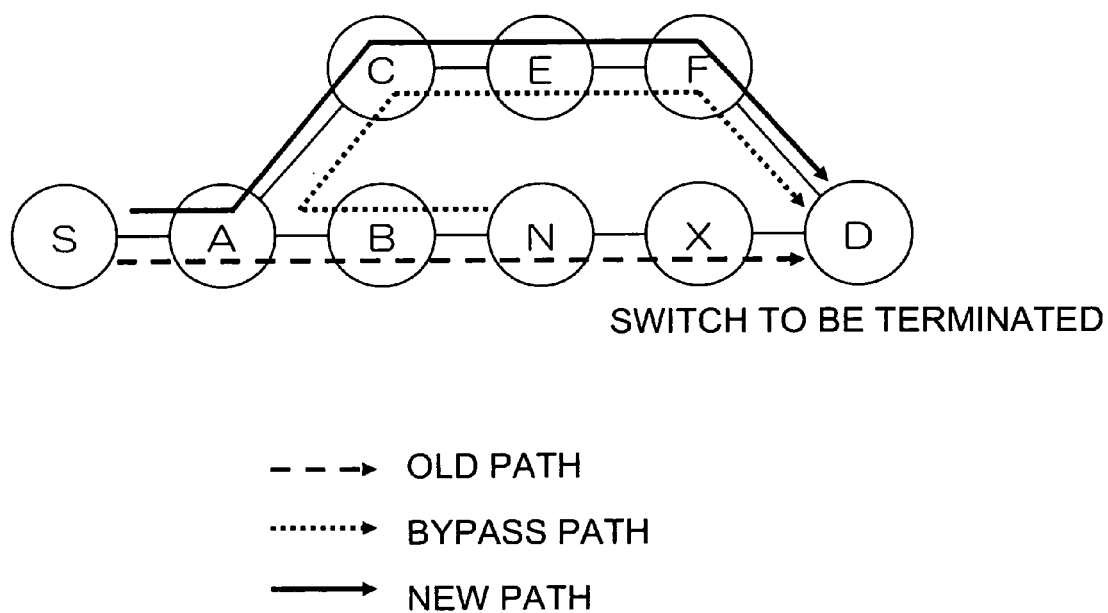
FIG. 6 illustrates an operation of a control apparatus in the second example.
Figure 8:
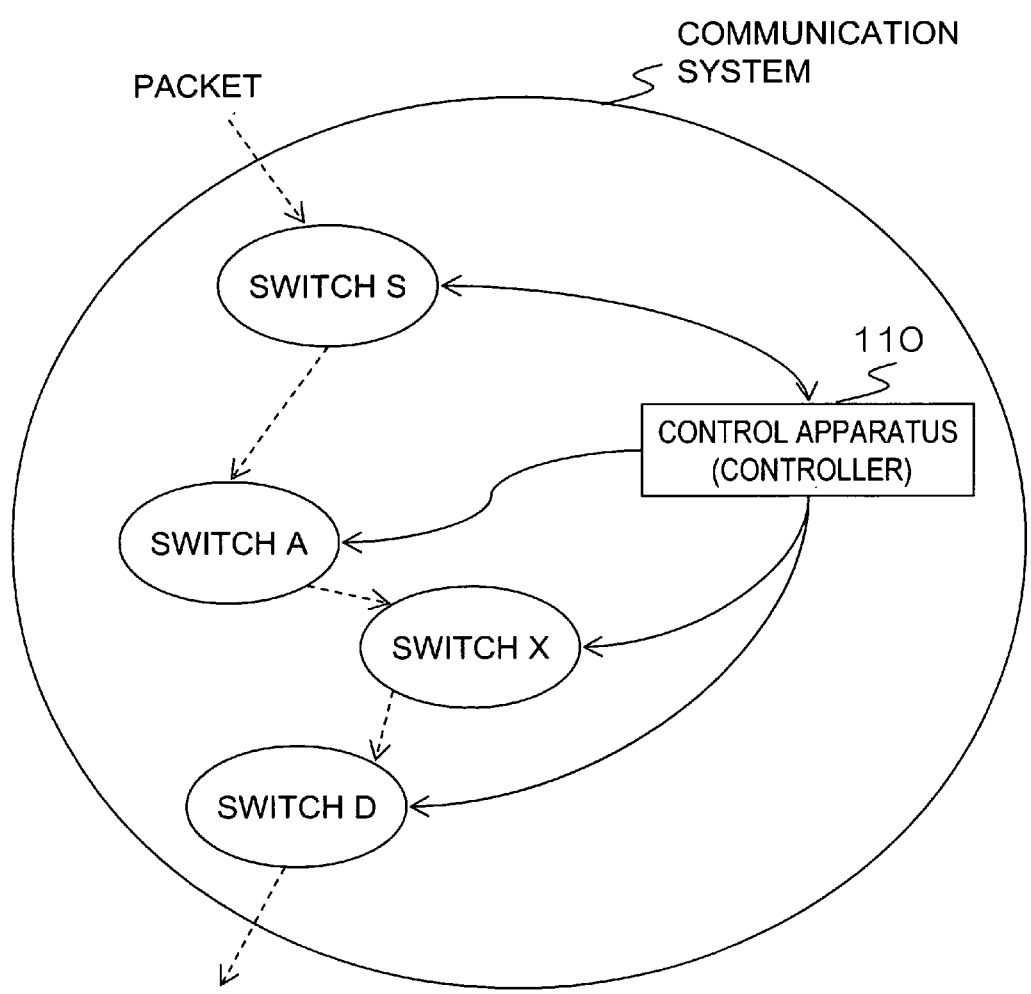
FIG. 8 schematically illustrates a communication system based on OpenFlow.
Figure 10A:
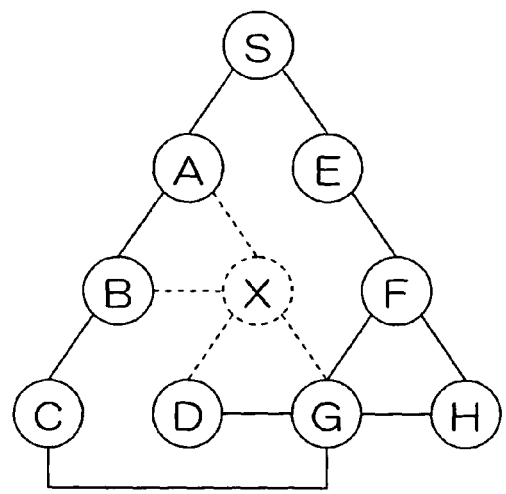
FIGS. 10A and 10B illustrate an operation of a conventional control apparatus.
Figure 10B:
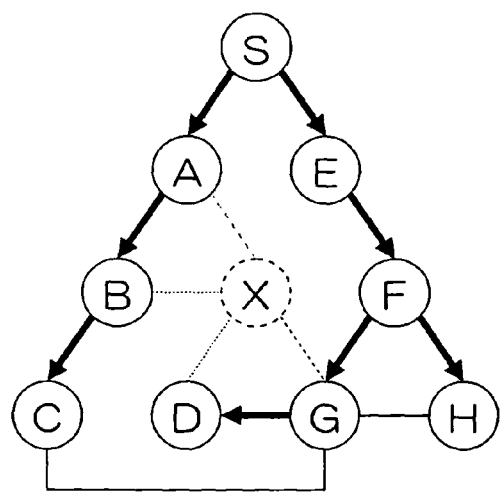
Figure 11:
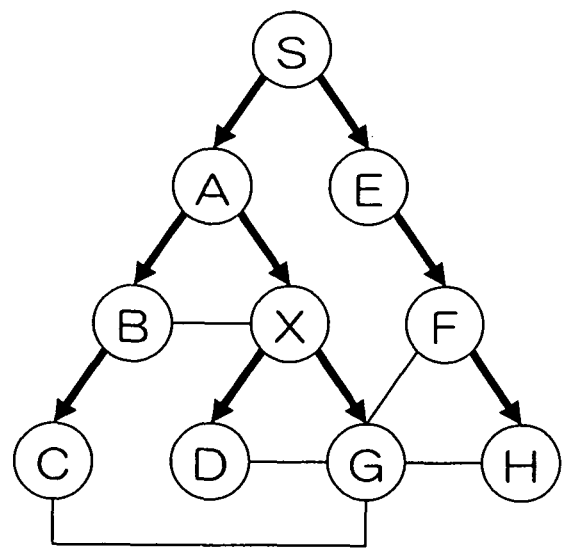
FIG. 11 illustrates an operation of the conventional control apparatus.

FIG. 6 illustrates a relationship between an old path, a bypass path, and a new path. In FIG. 6, a switch X is a switch to be terminated. A switch N is a switch adjacent to the switch X. Switches S and D are a flow start node and a flow end node, respectively. The old path used before the switch X is terminated is a path S→A→B→N→X→D represented by a dashed line. Next, the control apparatus 10 obtains a bypass path N→B→A→C→E→F→D represented by a dotted line, in which the switch N adjacent to the switch X is a start node and the switch D is an end node (step S16 in FIG. 2).

FIGS. 7A to 7E illustrate an operation of the control apparatus according to the present example. In FIGS. 7A to 7C, if the old path from the switch S to the switch N is connected to the bypass path from the switch N to the switch D, a new path S→A→B→N→B→A→C→E→F→D is obtained (step S17 in FIG. 2).

In this new path, since both of the switches before and after the switch N, which has connected the two paths, are the switch B, a redundant path B→N→B is deleted (step S18 in FIG. 2). Thus, the new path is changed to S→A→B→A→C→E→F→D (FIG. 7D).

With reference to FIG. 7D, both of the switches before and after the switch B whose path has been compressed are the switch A. Thus, a redundant path A→B→A is also deleted (step S18 in FIG. 2). As a result, the new path is changed to S→A→C→E→F→D.

Since both of the switches before and after the switch A whose path has been compressed are different switches, the path compression process is completed (step S18 in FIG. 2). By the above processes, the new path in the present example is determined to be S→A→C→E→F→D.

The data structures of the path management tables, the path configuration information, the aggregate path management tables, and the aggregate flow entity table for each switch that are described in the above exemplary embodiments are merely implementation examples. Needless to say, the present invention is not limited to such data structures. In addition, in the present invention, a node represents not only any one of the switches used in the above examples but also an arbitrary switch (L2/L3 switch), a router, and the like whose flow is controlled by a controller.

The present invention is not limited to the above exemplary embodiments. Further variations, substitutions, or adjustments can be made without departing from the basic technical concept of the present invention. The controller 10 in the above exemplary embodiments can be realized by a dedicated server. Other than the above OFS (OpenFlow Switch), the switches can be realized by nodes such as routers in an IP network or MPLS switches in an MPLS (Multi-Protocol Label Switching) network. The present invention is applicable to a network in which another controller centrally controls the nodes in the network.

Variations and adjustments of the exemplary embodiments and examples are possible within the scope of the overall disclosure (including claims) of the present invention and based on the basic technical concept of the invention. Various combinations and selections of various disclosed elements are possible within the scope of the claims of the present invention. That is, the present invention of course includes various variations and modifications that could be made by those skilled in the art according to the overall disclosure including the claims and the technical concept.

What is claimed is:

1. A communication system control apparatus comprising:
   a switch extraction unit extracting a second switch adjacent to a first switch to be terminated in a communication system including a plurality of switches having a predetermined topology;
   a path tree calculation unit calculating a shortest path tree including the second switch as a root, based on a topology obtained by excluding the first switch from the predetermined topology,
   a flow extraction unit extracting a flow transferred to the first switch after the second switch from a plurality of flows passing through the communication system;
   a path determination unit determining, assuming that, among the plurality of switches, switches located at start and end nodes of the flow are third and fourth switches, respectively, a bypass path from the second switch to the fourth switch, based on a topology obtained by excluding the first switch from the predetermined topology;
   a path generation unit connecting a path from the third switch to the second switch in an initial path of the flow and the bypass path determined by the path determination unit to generate a new path of the flow;
   a redundancy elimination unit eliminating, if the new path includes a redundant switch wherein if the switches before and after the second switch are an identical switch in the new path, the redundancy elimination unit eliminates a redundant path between the second switch and the identical switch; and
   wherein the path determination unit determines a path from the second switch to the fourth switch based on the shortest path tree.

2. The control apparatus according to claim 1, further comprising a path notification unit comparing an initial path of the flow with a new path of the flow, extracting a switch having a flow entry that needs to be updated from the plurality of switches, and notifying the extracted switch of the new path of the flow.

3. A communication system comprising:
   the control apparatus according to claim 1; and
   the plurality of switches.

4. The communication system control apparatus according to claim 1, further comprising a path notification unit comparing an initial path of the flow with a new path of the flow, and providing an identification of the new path of the flow.

5. The communication system control apparatus according to claim 1, wherein a number of switches adjacent to the first switch to be stopped is m, the path tree calculation unit calculates the shortest path tree m number of times, where m is an integer.

6. A communication system control method, comprising:
   by a computer, extracting a second switch adjacent to a first switch to be terminated in a communication system including a plurality of switches having a predetermined topology;
   calculating a shortest path tree including the second switch as a root, based on a topology obtained by excluding the first switch from the predetermined topology, wherein the determining comprises determining a path from the second switch to the fourth switch based on the shortest path tree;
   extracting a flow transferred to the first switch after the second switch from a plurality of flows passing through the communication system;
   determining, assuming that, among the plurality of switches, switches located at start and end nodes of the flow are third and fourth switches, respectively, a bypass path from the second switch to the fourth switch, based on a topology obtained by excluding the first switch from the predetermined topology;
   connecting a path from the third switch to the second switch in an initial path of the flow and the bypass path determined in the determining to generate a new path of the flow, and
   determining if the new path includes a redundant switch wherein if the switches before and after the second switch are an identical switch in the new path, eliminating a redundant path between the second switch and the identical switch.

7. The control method according to claim 6, further comprising: by a computer, comparing an initial path of the flow with a new path of the flow, extracting a switch having a flow entry that needs to be updated from the plurality of switches, and notifying the extracted switch of the new path of the flow.

8. The control method according to claim 6, further comprising, by a computer, eliminating, if the new path includes a redundant switch, a redundant path in the new path.

9. The control method according to claim 7, further comprising, by the extracted switch, update a flow entry based on the notified new path.

10. A non-transitory computer readable medium recorded thereon a program causing a computer to execute a method comprising:

extracting a second switch adjacent to a first switch to be terminated in a communication system including a plurality of switches having a predetermined topology;

causing the computer to further execute calculating a shortest path tree including the second switch as a root, based on a topology obtained by excluding the first switch from the predetermined topology, extracting a flow transferred to the first switch after the second switch from a plurality of flows passing through the communication system;

determining, assuming that, among the plurality of switches, switches located at start and end nodes of the flow are third and fourth switches, respectively, a bypass path from the second switch to the fourth switch, based on a topology obtained by excluding the first switch from the predetermined topology;

connecting a path from the third switch to the second switch in an initial path of the flow and the bypass path determined in the determining to generate a new path of the flow; and determining if the new path includes a redundant switch wherein if the switches before and after the second switch are an identical switch in the new path, eliminating a redundant path between the second switch and the identical switch wherein the determining comprises determining a path from the second switch to the fourth switch based on the shortest path tree.

11. The medium according to claim 10, further comprising causing a computer to further execute comparing an initial path of the flow with a new path of the flow, extracting a switch having a flow entry that needs to be updated from the plurality of switches, and notifying the extracted switch of the new path of the flow.

12. The medium according to claim 10, further comprising causing a computer to further execute eliminating, if the new path includes a redundant switch, a redundant path in the new path.

* * * * *